US006556463B1

(12) United States Patent
La Dret et al.
(10) Patent No.: US 6,556,463 B1
(45) Date of Patent: *Apr. 29, 2003

(54) REDUCED ELECTRONIC NOISE POWER SUPPLY TO DISCHARGE LAMPS, ESPECIALLY FOR MOTOR VEHICLE HEADLIGHTS

(75) Inventors: Daniel La Dret, Bobigny Cedex (FR); Jean-Marc Nicolaï, Bobigny Cedex (FR)

(73) Assignee: Valeo Vision, Bobigny Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/670,711

(22) Filed: Sep. 27, 2000

(30) Foreign Application Priority Data

Sep. 27, 1999 (FR) ........................................ 99 12114

(51) Int. Cl.[7] ........................................ H02M 7/5387
(52) U.S. Cl. ........................................ 363/132
(58) Field of Search ........................................ 363/17, 34, 40, 363/65, 131, 132

(56) References Cited

U.S. PATENT DOCUMENTS 3,737,756 A * 6/1973 Hasley et al. ................ 363/21
5,459,651 A * 10/1995 Machara ...................... 363/34
5,696,670 A * 12/1997 Roederer et al. ............ 363/21
5,907,223 A * 5/1999 Gu et al. .................... 315/247
5,936,357 A * 8/1999 Crouse et al. .............. 315/247
6,144,172 A * 11/2000 Sun ........................... 315/291

FOREIGN PATENT DOCUMENTS

| | | |
|---|---|---|
| EP | 0 291 223 | 11/1988 |
| EP | 0 744 883 | 11/1996 |
| EP | 0 785 702 | 7/1997 |
| EP | 0 944 294 | 9/1999 |

OTHER PUBLICATIONS

Stormberg H—P et al: "Excitation of acoustic instabilities in discharge lamps with pulsed supply voltage", Lighting Research and Technology, GB, Illuminating Engineering Society, London, vol. 15 No. 3, Mar. 1, 1983 pp. 127–132.

* cited by examiner

*Primary Examiner*—Adolf Deneke Berhane
(74) *Attorney, Agent, or Firm*—Morgan & Finnegan, LLP

(57) ABSTRACT

A discharge lamp for a motor vehicle headlight is fed through a power supply device which includes a dc/ac converter. The power supplied to the dc/ac converter is modulated over time, preferably in a pseudo-random sequence. A power supply device adapted to perform this method is also described.

7 Claims, 1 Drawing Sheet

REDUCED ELECTRONIC NOISE POWER SUPPLY TO DISCHARGE LAMPS, ESPECIALLY FOR MOTOR VEHICLE HEADLIGHTS

FIELD OF THE INVENTION

The present invention relates to the control of the power supply to discharge lamps, especially in motor vehicle headlights.

BACKGROUND OF THE INVENTION

Reference is made here to FIG. 1 of the accompanying drawings, which shows diagrammatically a power supply device for a discharge lamp for a motor vehicle headlight. Conventionally, the power supply device includes a direct current/direct current converter 1 (referred to in this specification as a dc/dc converter), which feeds power to a second converter 2. The converter 2 is a direct current/alternating current converter (referred to in this specification as a dc/ac converter), which itself supplies the discharge lamp 3.

The dc/dc converter 1 includes for example a transformer T and an interrupter Q1, which controls the power supply to the primary transformer T, the interrupter Q1 being itself controlled by a regulator 4. Interruptors Q2, in the H-connected bridge constituting the dc/ac converter 2, are controlled by a control circuit 5 which is a clock circuit.

The switching frequency of the interrupters in the converter 1 is of the order of 200 Hz to 1 KHz. However, such low frequency power supply gives rise to a substantial amount of electromagnetic noise.

One object of the invention is to propose a control means which enables the above mentioned noise to be eliminated completely, or at least to be substantially reduced.

In the field of electronics, it is known in general terms that electromagnetic noise generated by a power circuit with a switching function can be greatly diminished by widening the spectrum of the control frequencies. In this regard, reference may be made to the following papers:

"The Effect of Carrier Frequency Modulation of PWM Waveforms on Conducted EMC Problems in Switched Mode Power Supplies", Stone, David and Chambers, Barry, University of Sheffield, Department of Electronic and Electrical Engineering, EPE Journal volume 5 No. 3/4, January 1996;

"Effect of Spread-spectrum Modulation of Switched Mode Power Converter PWM Carrier Frequencies on Conducted EMI", Stone, David and Chambers, Barry, University of Sheffield, Department of Electronic and Electrical Engineering, IEE Mar. 16, 1995, Electronics Letters No. 19950543;

"Random Carrier Frequency Modulation of EMC Problems in Switched Mode Power Supplies", Stone, David, Chambers, Barry and Howe, David, University of Sheffield, Department of Electronic and Electrical Engineering, IEEE Catalogue No. 95TH8025 1995.

One solution for reducing the electronic noise produced by the alternating power supply of a discharge lamp could therefore be to modify the control of the interrupters of its dc/ac converter so as to widen its switching frequency spectrum.

DISCUSSION OF THE INVENTION

According to the invention in a first aspect, a method of controlling a power supply device for a discharge lamp, especially for a motor vehicle headlight, the said power supply device comprising a dc/ac converter, is characterised in that the power supplied to the said dc/ac converter is modulated over time.

Preferably, the power supplied to the dc/ac converter is modulated in a pseudo-random sequence.

A method according to the invention has the advantage that it spreads the spectrum which leads to reduction or suppression of the electromagnetic noise without any modification of the control for the interrupters of the dc/ac converter.

According to the invention in a second aspect, a power supply device for a discharge lamp, especially for a motor vehicle headlight, comprising a dc/ac converter and means for generating a supply power which is passed as input to the said converter, is characterised in that the said means comprise means for modulating the said supply power.

Preferably, the means for generating the supply power passed as input to the said converter comprise a dc/dc converter and regulating means, and the said regulating means control the dc/dc converter in such a way that the latter delivers modulated power.

In another embodiment of the invention, the means for generating the supply power transmitted as input to the dc/ac converter comprise a dc/dc converter, and the said device further includes means for adding a modulated differential power to the power output from the direct current/direct current converter.

Further features and advantages of the invention will appear more clearly on a reading of the following detailed description of some preferred embodiments of the invention, given by way of non-limiting example only and with reference to the accompanying drawings.

DESCRIPTION OF PREFERRED EMBODIMENTS OF THE INVENTION

Figure 1:
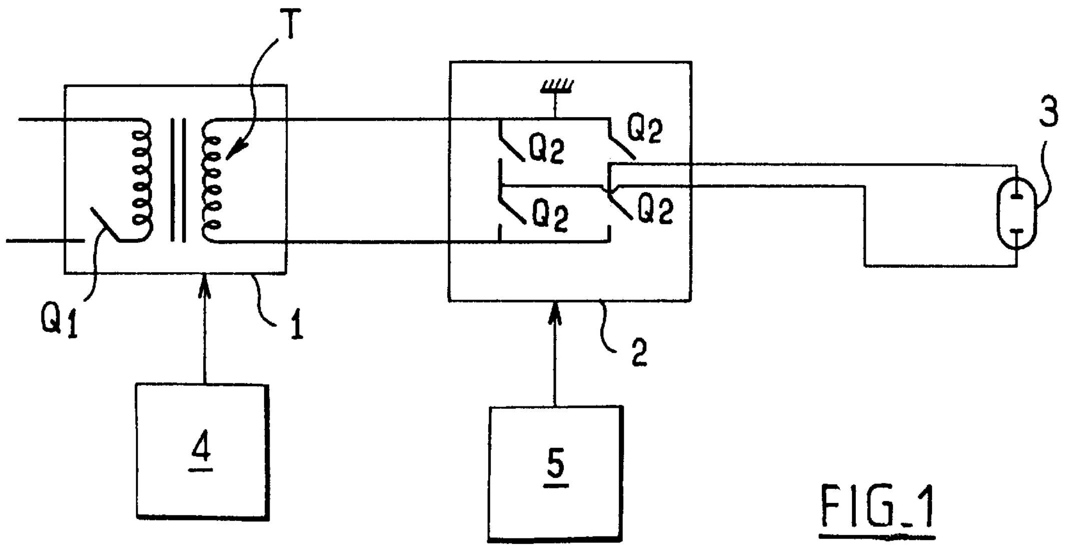
FIG. 1, already discussed above, shows diagrammatically a power supply device for a discharge lamp.
Figure 2:
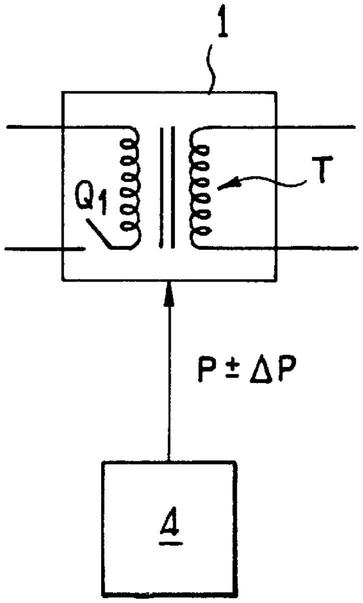
FIG. 2 shows diagrammatically one possible embodiment of the invention.

In the embodiment shown in FIG. 2, the regulator 4 controls the transistor Q1 of the dc/dc converter 1 in such a way that it delivers at the input of the dc/ac converter 2 a power P±ΔP, where P is the mean power that is to be delivered to the lamp 3, and ±ΔP is a modulation which is added to the power delivered to the dc/ac converter so as to widen the spectrum of the current flowing in the discharge lamp 3.

In this connection, it is known that the power P that passes through the lamp is such that:

$$P=1/2LI^2f$$

where L is the inductance of the circuit in which the lamp is connected, I is the intensity of the current through the lamp, and f is the frequency of that current.

Thus, by modulating the input power to the dc/ac converter 2, the frequency spectrum of the current in the discharge lamp 3 is widened.

As will be understood, this version is particularly advantageous to make, because it only requires simple reprogramming of the power regulator 4. In addition, and in a manner which is particularly preferred, the power modulation will take place in a pseudo-random sequence. This gives an especially favourable spread of the spectrum because the latter amounts to the addition of white noise to the switching action generated by the converter 2.

By way of example, the differential power can be more or less than 500 milliwatts for a mean power of the order of 35 watt at the output of the dc/dc converter.

With such a modulation, spreading of the spectrum can be obtained which greatly limits the levels of emission of the perturbations that generate electromagnetic radiation on the fundamental and harmonics of the power supply at switch-off.

Thus, electromagnetic noise is reduced by 8 dB over substantially the whole of the spectrum which is taken into account in characterising the electromagnetic noise in the automotive field.

Figure 3:
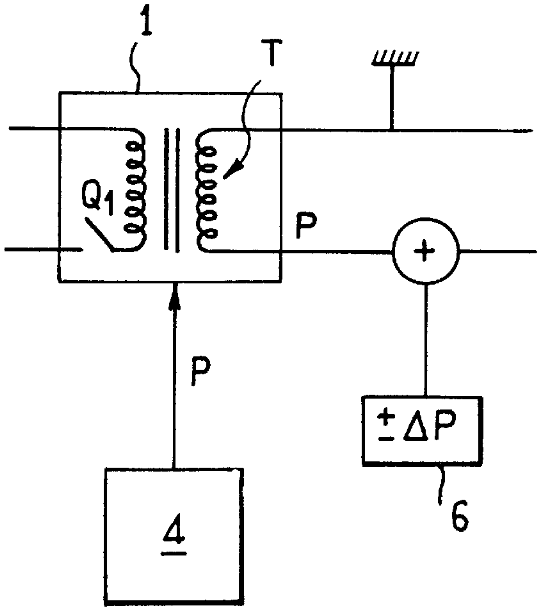
FIG. 3 shows diagrammatically another possible embodiment of the invention.

Further embodiments, other than those in FIG. 2, can of course be envisaged. In particular, and as shown in FIG. 3, power modulation may be generated not by the regulator 4 but by independent means, for example a module 6 shown in FIG. 3, these means being added in an analogue manner to the output of the dc/ac converter 2.

What is claimed is:

1. A power supply adapted to provide alternating current power to a lamp, the power supply comprising:

a dc/dc converter adapted to provide a direct current power, the dc/dc converter having a transformer and a dc/dc interrupter configured to control power supply to the transformer;

a dc/ac converter having a second interrupter controlled by a clock circuit adapted to receive the direct current power from the dc/dc converter and to output an alternating current power; and a regulator configured to control the dc/dc interruptor to modulate the direct current power supplied to the dc/ac converter so that a spectrum of current flowing in the lamp is widened without modifying control of the second interruptor of the dc/ac converter.

2. The power supply of claim 1, wherein the regulator is configured to modulate the direct current power supplied to the dc/ac converter without any modifications of the control for the interrupters of the dc/ac converter.

3. A method comprising:

providing a power supply and a discharge lamp associated with the power supply, the power supply comprising (1) a dc/dc converter with a transformer having an input and an output, and (2) a dc/ac current converter connected to the transformer output; and regulating the dc/dc converter to modulate the transformer output supplied to the dc/ac current converter to widen the spectrum of current flowing into the lamp without modifying control of the dc/ac converter.

4. The method of claim 3, wherein the step of regulating the dc/dc converter to modulate the transformer comprises providing a pseudo-randomly modulated transformer output.

5. A method comprising:

providing a power supply and a discharge lamp associated with the power supply, the power supply comprising (1) a dc/dc converter with a transformer having an input and an output, and (2) a dc/ac current converter connected to the transformer output; and adding a modulated differential power to the transformer output supplied to the dc/ac current converter to widen the spectrum of current flowing into the lamp without modifying control of the dc/ac converter.

6. The method according to claim 5, wherein the differential power is modulated pseudo-randomly.

7. A power supply for supplying AC voltage to a lamp, said power supply comprising a dc voltage input;

a dc/dc converter associated with the dc voltage input, said dc/dc converter having a voltage output;

a dc/ac converter adapted to receive the dc voltage output and to provide ac power to the lamp; and means for widening the spectrum of current flowing into the lamp without modifying control of the dc/ac converter.

* * * * *